US011324101B2

United States Patent
Chen et al.

(10) Patent No.: US 11,324,101 B2
(45) Date of Patent: May 3, 2022

(54) ACTIVE FLUID STATIC ELIMINATION SYSTEM

(71) Applicants: Marketech International Corp., Taipei (TW); Hsao-Szu Chang, Miaoli County (TW)

(72) Inventors: Ping-Hsu Chen, Taichung (TW); Chien-Kuo Lu, Hsinchu (TW); Hsao-Szu Chang, Miaoli County (TW)

(73) Assignees: Marketech International Corp., Taipei (TW); Hsao-Szu Chang, Miaoli County (TW)

( * ) Notice: Subject to any disclaimer, the term of this patent is extended or adjusted under 35 U.S.C. 154(b) by 68 days.

(21) Appl. No.: 17/089,739

(22) Filed: Nov. 5, 2020

(65) Prior Publication Data

US 2021/0378080 A1 Dec. 2, 2021

(30) Foreign Application Priority Data

Jun. 2, 2020 (TW) .................................. 109118488

(51) Int. Cl.
| | | |
|---|---|---|
| *H05F 3/04* | (2006.01) | |
| *F16K 15/02* | (2006.01) | |
| *G01N 27/06* | (2006.01) | |
| *G01N 27/60* | (2006.01) | |

(52) U.S. Cl.
CPC ............. *H05F 3/04* (2013.01); *F16K 15/025* (2013.01); *G01N 27/06* (2013.01); *G01N 27/60* (2013.01)

(58) Field of Classification Search
CPC ......... H05F 3/04; F16K 15/025; G01N 27/60; G01N 27/06
See application file for complete search history.

(56) References Cited

U.S. PATENT DOCUMENTS

| | | | | |
|---|---|---|---|---|
| 3,753,102 A | * | 8/1973 | Beck | G01N 27/60 324/109 |
| 4,309,661 A | * | 1/1982 | Kamoto | G01R 29/24 137/551 |
| 5,824,914 A | * | 10/1998 | Seppa | G01F 1/588 73/861.11 |
| 2017/0127503 A1 | * | 5/2017 | Lu | F04B 7/02 |
| 2020/0174054 A1 | * | 6/2020 | Tung | G01N 27/60 |
| 2020/0236766 A1 | * | 7/2020 | Wei | F16L 57/00 |
| 2021/0199704 A1 | * | 7/2021 | Tung | G01R 29/14 |

FOREIGN PATENT DOCUMENTS

TW M518745 U 3/2016

* cited by examiner

*Primary Examiner* — Scott Bauer
(74) *Attorney, Agent, or Firm* — CKC & Partners Co., LLC

(57) ABSTRACT

An active fluid static elimination system installed in a fluid transportation pipeline includes a solenoid valve, an electrostatic measuring device, a fluid destaticizer, and a controller. The solenoid valve is connected to a connecting port of the fluid transportation pipeline, and the electrostatic measuring device is used to measure an electrostatic value of a fluid in the fluid transportation pipeline. The fluid destaticizer is connected to the solenoid valve, and the controller is connected to the electrostatic measuring device and the solenoid valve. The solenoid valve is opened to allow the fluid passing through the fluid destaticizer to eliminate the electrostatic charge of the fluid when the controller determines that the electrostatic value measured by the electrostatic measuring device is greater than a predetermined value.

10 Claims, 6 Drawing Sheets

ACTIVE FLUID STATIC ELIMINATION SYSTEM

RELATED APPLICATIONS

This application claims priority to Taiwan Application Serial Number 109118488, filed Jun. 2, 2020, which is herein incorporated by reference.

TECHNICAL FIELD

The present disclosure generally relates to a fluid static elimination system. More particularly, the present disclosure relates to an active fluid static elimination system.

BACKGROUND

Static electricity is a phenomenon in the nature, and when an object with static electricity comes in contact with an object with a potential difference, electric charge transfer may occur and result in spark discharge.

Since two different substances rub against each other, contact, and separate and electrify, static electricity may be generated. In severe cases, the surrounding flammable material may be ignited, and a fire or explosion may therefore occur. Accordingly, the static electricity problem and the harm caused by the static electricity have attracted more and more attention. In the chemical, petroleum, coatings, plastics, printing and electronics industries, potential electrostatic hazards are prone to accidents, which can cause casualties and property losses.

In the industrial production process, static electricity may be generated with various operations, such as tearing, peeling, pulling, impacting, crushing, screening, rolling, stirring, conveying, spraying and filtering materials, as well as gas and liquid flow, splashing, spraying, etc. If static electricity accumulates to a dangerous level, electrostatic discharge may occur. The fundamental reason that static electricity can cause various hazards is that the electrostatic discharge sparks have the energy to ignite the surrounding material. When the spark energy generated by the electrostatic discharge is greater than the minimum ignition energy (MIE) required by the explosive mixture, the spark energy may cause a fire or an ignition source of the explosion.

According to the statistics of the research report database of the Institute of Labor Safety and Health, the petrochemical industry has the highest fire or explosion hazard, followed by the chemical materials industry and chemical products manufacturing industries. The main reason is that most of the liquids, gases and other substances utilized in the petrochemical industry and the chemical industry are flammable. Therefore, the proportions of the electrostatic hazard accidents in the three industries are higher the other industries.

Case 1: At about 13:00 on Oct. 29, 2007, a fire and a series of explosions occurred in a chemical storage and transportation site in Iowa, USA. At that moment, Ethyl acetate was being injected into 300-gallon tanks to sub-pack the Ethyl acetate, the operator used a synthetic rubber hose to transport the solvent to the top of the tanks, and immediately heard the explosion sound. The fire extended to a warehouse and ignited other flammable and combustible liquids stored in the warehouse. Hence, an employee was slightly injured, and 1 firefighter was burned.

Case 2: At about 14:00 on Nov. 11, 2008, a fire and explosion accident occurred in a waterproof coating company in Taoyuan County, Taiwan. At the time of the accident, the solvent-based coating production process was in progress. The organic solvent toluene and the paint solvent are mixed and stirred with paint raw materials. When the bottom toluene tank was pumped by air pressure to inject the toluene solvent into an inlet above the stirring tank, a fire and explosion accident occurred suddenly, and one of two onsite operators died and the other one suffered severe burns.

According to cases at home and abroad, if the problem of static electricity cannot be overcome when chemical liquid is transported, the static electricity can cause very serious consequences. Therefore, there is a need to safely and reliably transport the chemical solvents to reduce the occurrence of accidents and help improve the production safety.

SUMMARY

One objective of the embodiments of the present invention is to provide an active fluid static elimination system able to reduce the electrostatic charge accumulated in a chemical fluid pipeline.

To achieve these and other advantages and in accordance with the objective of the embodiments of the present invention, as the embodiment broadly describes herein, the embodiments of the present invention provides an active fluid static elimination system installed in a connecting section of a fluid delivery pipeline. The active fluid static elimination system includes a solenoid valve, an electrostatic measuring device, and a controller. The solenoid valve is connected to the connecting section of the fluid delivery pipeline, the electrostatic measuring device measures an electrostatic value of a fluid in the fluid delivery pipeline, the fluid destaticizer is connected to the solenoid valve, and the controller is connected to the electrostatic measuring device and the solenoid valve. When the controller determines the electrostatic value of the fluid measured by the electrostatic measuring device is greater than a predetermined value, the controller opens the solenoid valve to allow the fluid passing through the fluid destaticizer to eliminate an electrostatic charge in the fluid.

In some embodiments, the electrostatic measuring device includes an electrostatic sensor fixed on the fluid delivery pipeline to measure the electrostatic value of the fluid in the fluid delivery pipeline.

In some embodiments, the solenoid valve is a first solenoid valve, and the active fluid static elimination system further includes a deionized water solenoid valve disposed between the first solenoid valve and the connecting section, and the deionized water solenoid valve is electrically connected to the controller.

In some embodiments, the controller opens the deionized water solenoid valve to wash the first solenoid valve and the fluid destaticizer with deionized water.

In some embodiments, the active fluid static elimination system further includes a booster pump equipped in the fluid delivery pipeline to provide a pressure for transporting the fluid.

In some embodiments, the electrostatic discharger includes a valve main body, a one-way check valve, a discharge vessel and an electrostatic discharger. The one-way check valve is installed in the valve main body, the discharge vessel is disposed in the valve main body, the discharge vessel is connected to the one-way check valve and the discharge vessel includes a sidewall. The electrostatic discharger is installed on the sidewall of the discharge vessel to discharge an electrostatic charge in a fluid and the fluid is exhausted from the valve main body through the discharge vessel.

In some embodiments, the one-way check valve includes a piston and a spring.

In some embodiments, the piston is a perfluoroalkoxy alkanes (PFA) piston, and the valve main body is a PFA valve main body.

In some embodiments, the spring is a PFA spring or a metal spring with a PFA coating.

In some embodiments, the electrostatic discharger includes an electrostatic discharging pin electrically connecting to a ground terminal.

In some embodiments, the electrostatic discharging pin includes an noble metal electrostatic discharging pin.

Hence, the active fluid static elimination system can install in the fluid delivery pipeline and control the solenoid valves according to the electrostatic value of the fluid measured by the electrostatic measuring device to discharge the electrostatic charge accumulating in the fluid delivery pipe out of the fluid delivery pipe. In addition, the piston, the spring and the valve main body can be made of the PFA material so as to effectively prevent the fluid from the metal contamination. Furthermore, the fluid in contact with the metal electrostatic discharger is directly discharged from the discharge outlet, and the solenoid valves and the electrostatic discharger are cleaned by the deionized water so as to further effectively avoid the pollution of the process fluid, thereby improving the production quality of the production line, further improving the safety of the fluid delivery, and greatly increasing the safety of the production process and the process yield.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
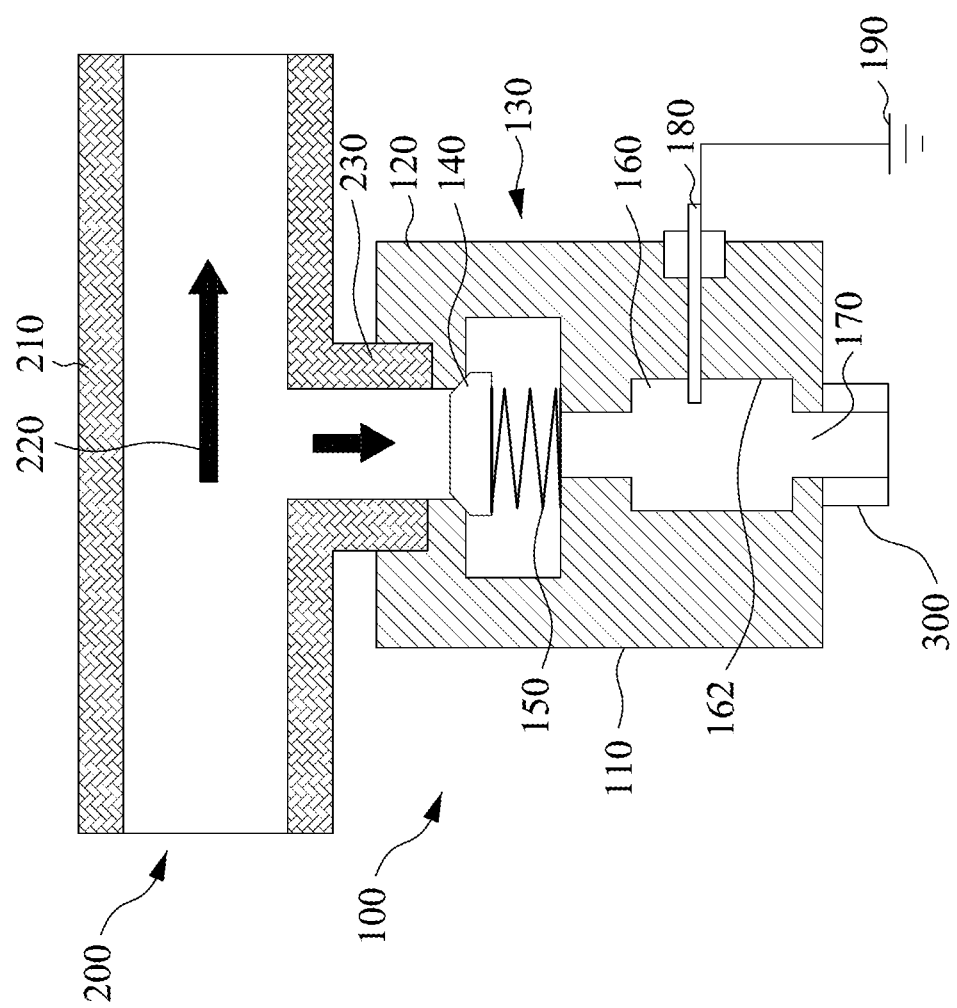
FIG. 1 illustrates a schematic diagram showing a fluid destaticizer according to one embodiment of the present invention equipped in a fluid delivery pipeline.
Figure 2:
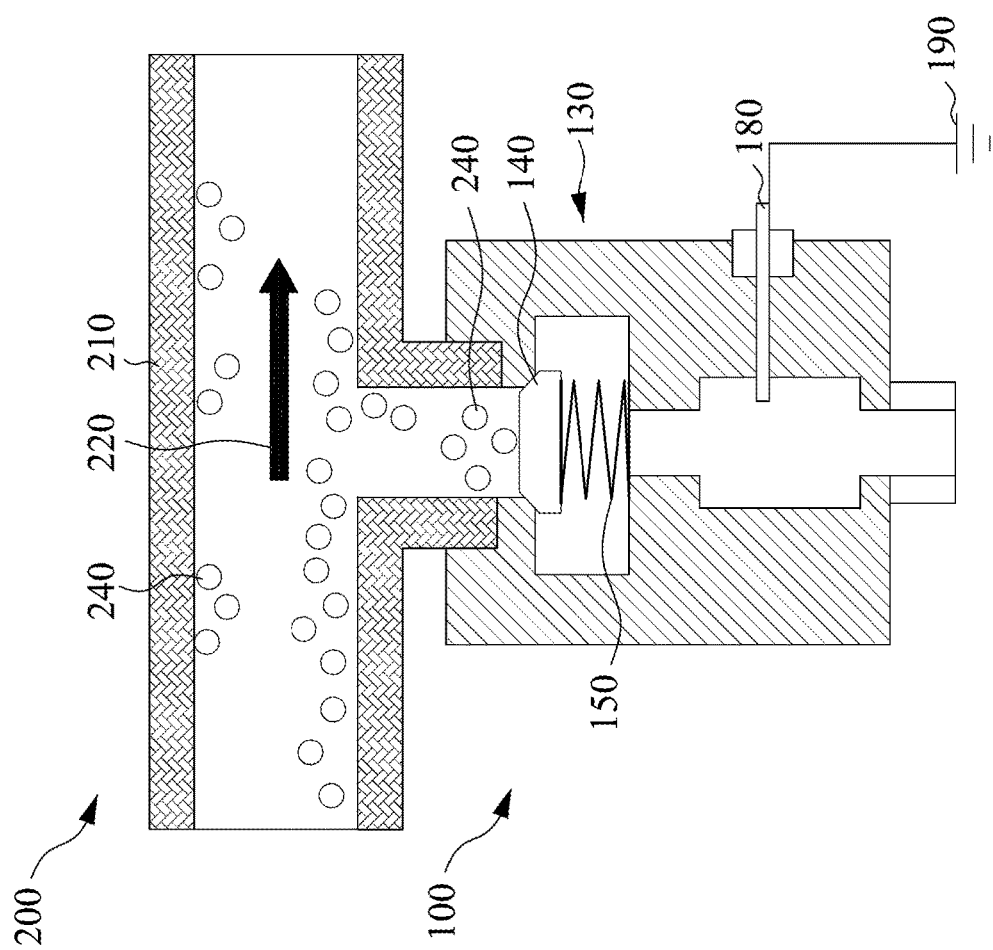
FIG. 2 illustrates a simulation diagram showing an electrostatic charge accumulated in the fluid delivery pipeline while the fluid is delivering.
Figure 3:
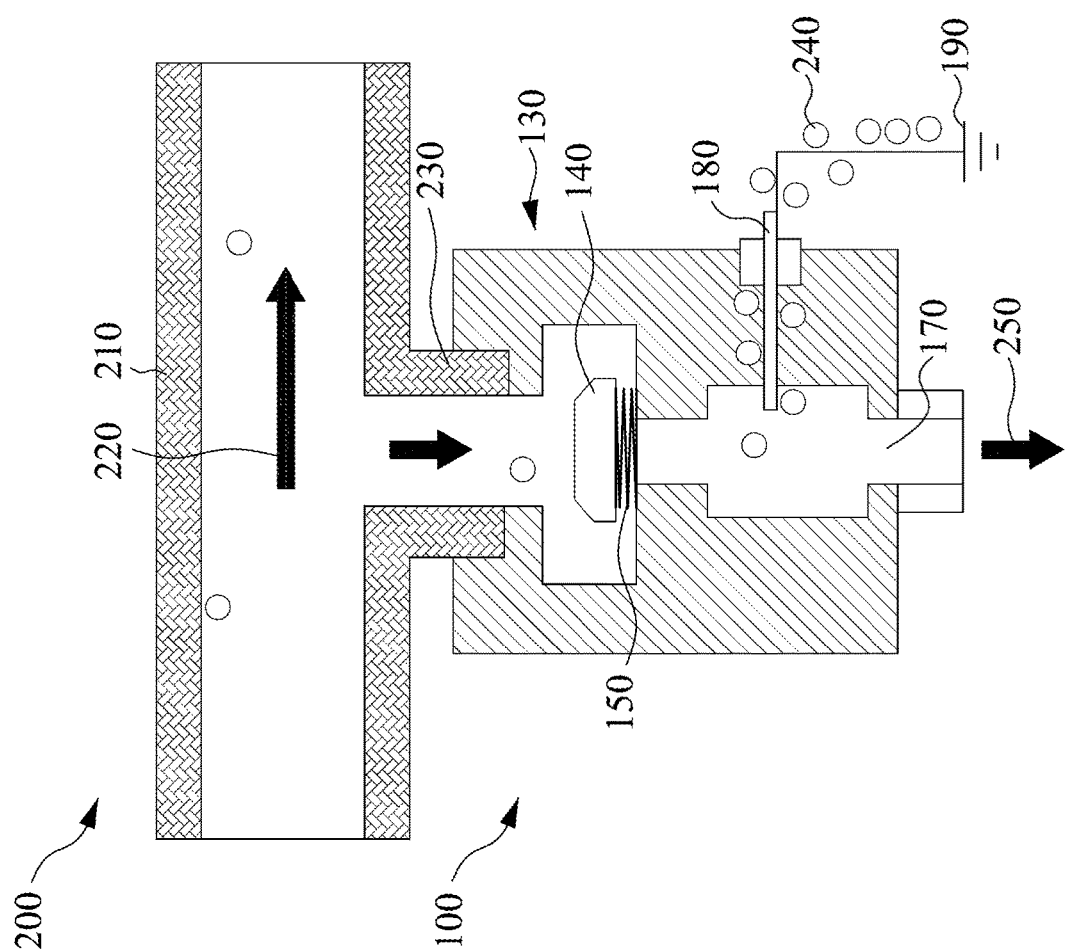
FIG. 3 illustrates a simulation diagram showing the electrostatic charge in the fluid is discharged and the fluid is exhausted through the fluid destaticizer when the fluid is delivered in the fluid delivery pipeline.
Figure 4:
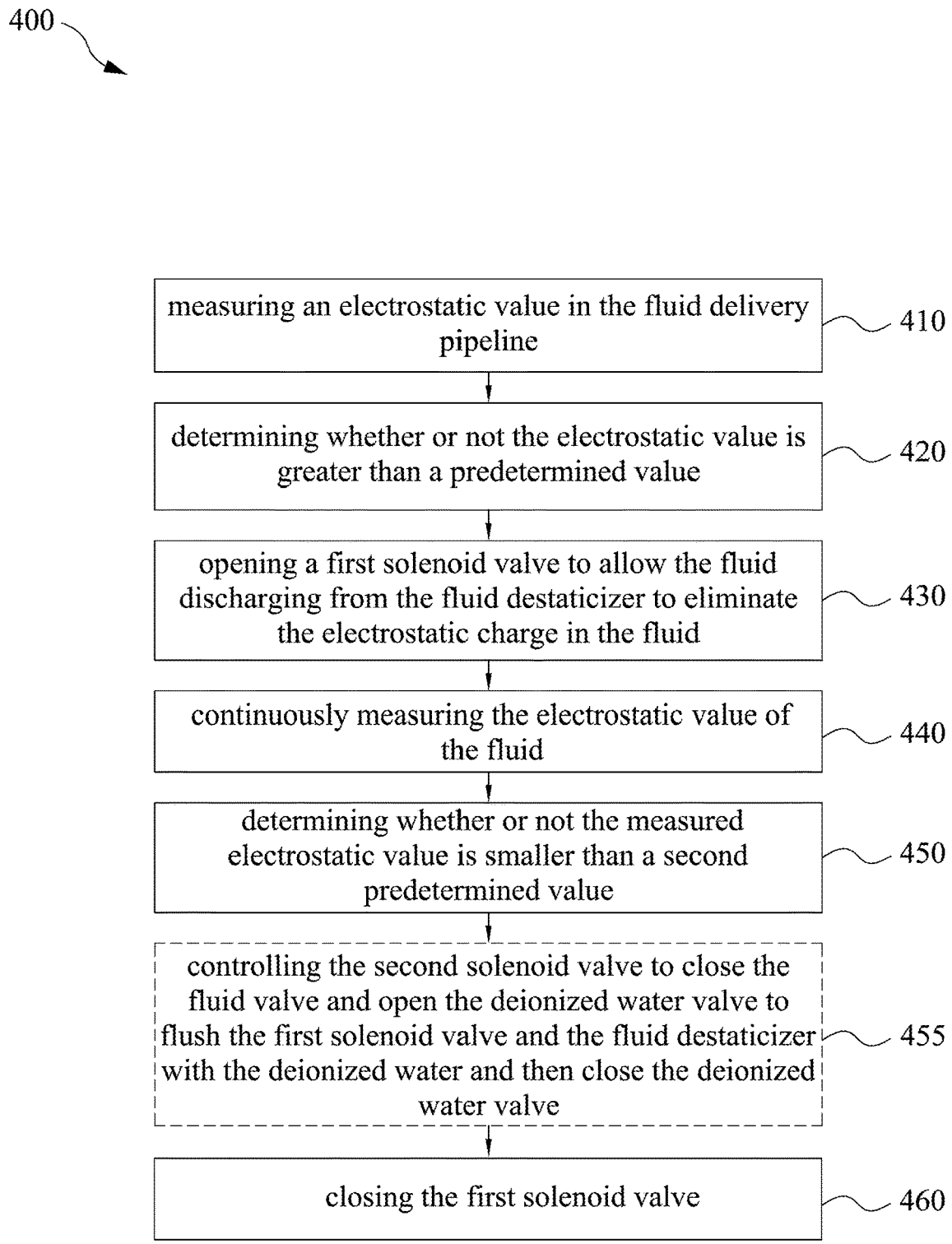
FIG. 4 illustrates an active fluid static elimination method according to another aspect of the present invention.

FIG. 1 illustrates a fluid destaticizer according to one embodiment of the present invention equipped in a fluid delivery pipeline, FIG. 2 illustrates the electrostatic charge accumulated in the fluid delivery pipeline while the fluid is delivering, and FIG. 3 illustrates the electrostatic charge in the fluid is discharged and the fluid is exhausted through the fluid destaticizer. FIG. 4 illustrates an active fluid static elimination method, FIG. 5 illustrates an active fluid static elimination system, and FIG. 6 illustrates another active fluid static elimination system.

Figure 5:
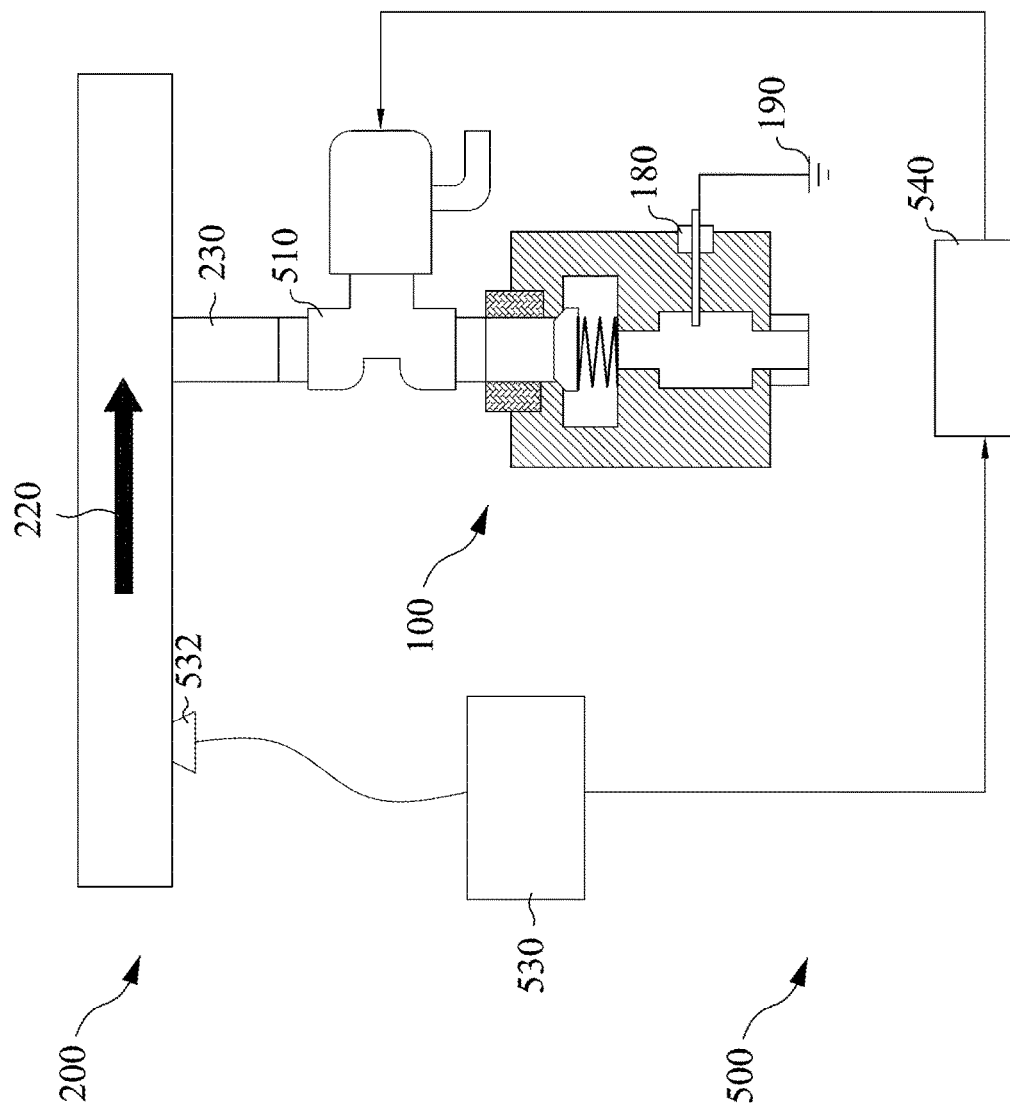
FIG. 5 illustrates an active fluid static elimination system according to one embodiment of the present invention.
Figure 6:
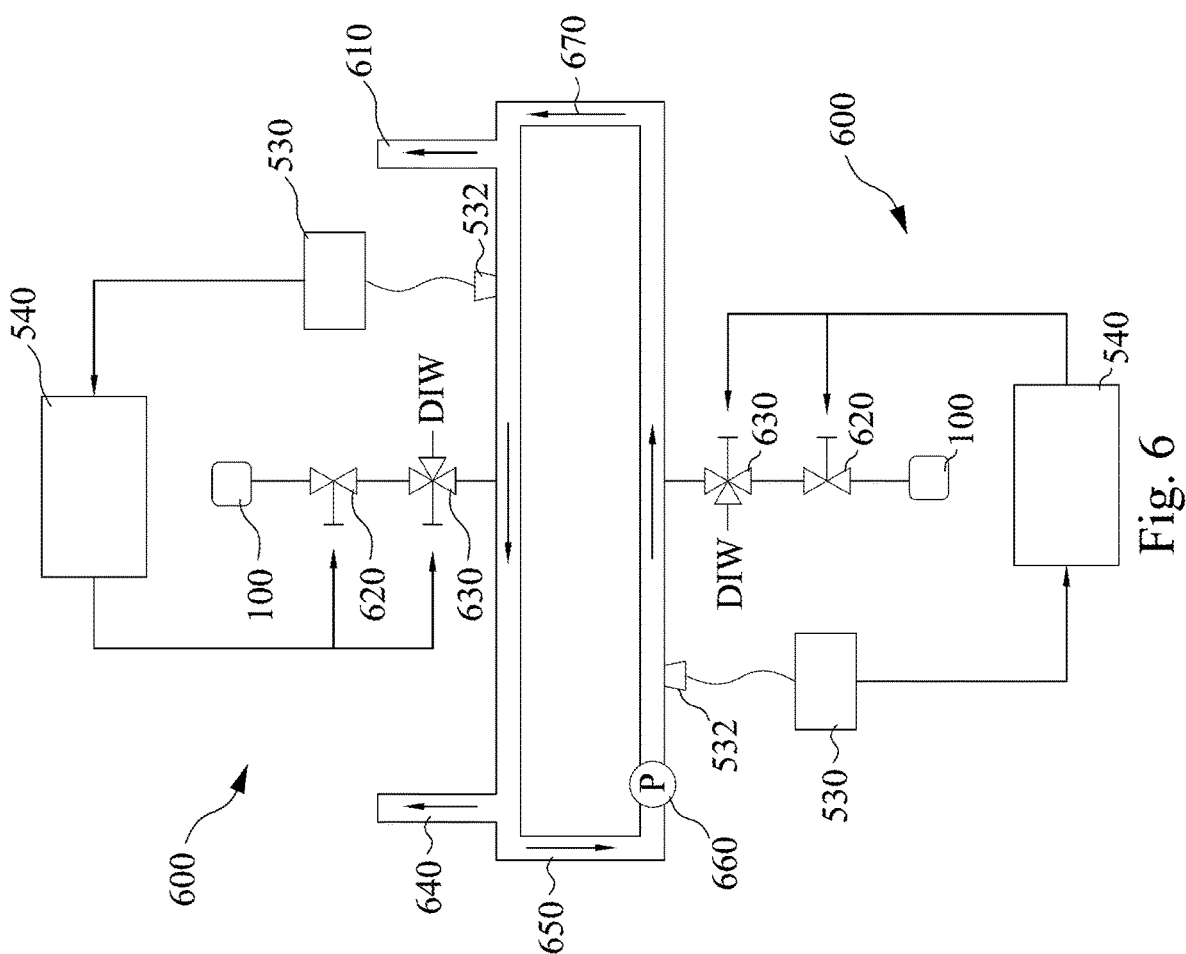
FIG. 6 illustrates an active fluid static elimination system according to another embodiment of the present invention.

Referring to FIGS. 4 and 5, as shown in FIG. 5, the active fluid static elimination system 500 is installed in a fluid delivery pipeline 200, and the active fluid static elimination system 500 includes a solenoid valve 510, an electrostatic measuring device 530, a fluid destaticizer 100 and a controller 540. The fluid delivery pipeline 200 is utilized to transport a fluid 220, and the fluid delivery pipeline 200 has a connecting section 230. The solenoid valve 510 is connected to the connecting section 230 of the fluid delivery pipeline 200, and the electrostatic measuring device 530 is utilized to measure an electrostatic value of the fluid 220 in the fluid delivery pipeline 200. In some embodiments, the electrostatic measuring device 530 can detect the electrostatic value from 0.2 kV (kilovolt) to 20 kV. In addition, the fluid destaticizer 100 is connected to the solenoid valve 510.

Furthermore, the controller 540 is connected to the electrostatic measuring device 530 and the solenoid valve 510. When the controller 540 determines that the electrostatic value, measured by the electrostatic measuring device 530, of the fluid 220 is greater than a predetermined value, the controller 540 opens the solenoid valve 510 to allow the fluid 220 passing through the fluid destaticizer 100 so as to eliminate the electrostatic charge of the fluid 220. In some embodiments, the predetermined value of the electrostatic value is about 2 kV. In some embodiments, the electrostatic value is greater than 1 kV, the controller 540 opens the solenoid valve 510.

In some embodiments, the fluid is a fluid used in factories such as chemical liquids, organic solvents, or slurries with solid particles.

In some embodiments, the electrostatic measuring device 530 includes an electrostatic sensor 532 fixed on the fluid delivery pipeline 200 to measure the electrostatic value of the fluid 220 in the fluid delivery pipeline 200.

Simultaneously referring to FIG. 4, the active fluid static elimination method 400 is described with the active fluid static elimination system 500. First, in step 410 of the active fluid static elimination method 400, an electrostatic measuring device 530 measures the electrostatic value in the fluid delivery pipeline 200. In step 420, the controller 540 determines whether or not the electrostatic value is greater than a predetermined value, i.e. 2 kV. In step 430, when the controller 540 determines that the measured electrostatic value is greater than a predetermined value, the controller 540 opens a solenoid valve 510 to allow the fluid 220 discharging from the fluid destaticizer 100 to eliminate the electrostatic charge in the fluid 220. Subsequently, in step 440, the electrostatic measuring device 530 continuously measures the electrostatic value of the fluid 220 in the fluid delivery pipeline 200. In step 450, the controller 540 determines whether or not the measured electrostatic value is smaller than a second predetermined value, for example, 1 kV. In step 460, when the controller 540 determines that the electrostatic value of the fluid 220 is smaller than the second predetermined value, the controller 540 closes the solenoid valve 510 so as to continuously transport the fluid to the manufacturing device.

In addition, step 455 may be described together with the active fluid static elimination system 600 in FIG. 6. Referring to FIG. 6, the active fluid static elimination system 600 is installed in the fluid delivery pipeline 650. At least one set of the active fluid static elimination system 600 can be installed in the fluid delivery pipeline 650 according to the requirement of the manufacturing process. However, two or above sets of the active fluid static elimination systems 600 can be installed in the fluid delivery pipeline 650 according to the requirement of the manufacturing process without departing from the spirit and the scope of the invention.

The fluid delivery pipeline 650 includes a first user transport pipe 610 and a second user transport pipe 640, and two active fluid static elimination systems 600 to eliminate the electrostatic charge of the fluid 670 in the fluid delivery pipeline 650.

Each active fluid static elimination system 600 includes a solenoid valve 620, i.e. a first solenoid valve, a solenoid valve 630, i.e. a second solenoid valve, an electrostatic measuring device 530, a fluid destaticizer 100 and a controller 540. The fluid delivery pipeline 650 is utilized to transport a fluid 670 to the manufacturing devices in the manufacturing process through the first user transport pipe 610 and the second user transport pipe 640. The solenoid valve 630 is connected to the connecting section of the fluid delivery pipeline 650, and the electrostatic measuring device 530 measures an electrostatic value of the fluid 670 in the fluid delivery pipeline 650. In some embodiments, the electrostatic measuring device 530 can detect the electrostatic value about 0.2 kV to 20 kV. The fluid destaticizer 100 is connected to the solenoid valve 620, and the solenoid valve 620 is disposed between the solenoid valve 630 and the fluid destaticizer 100.

Furthermore, the controller 540 is electrically connected to the electrostatic measuring device 530 and the solenoid valve 620. When the controller 540 determines that the electrostatic value, measured by the electrostatic measuring device 530, of the fluid 670 is greater than a predetermined value, the controller 540 opens the solenoid valve 620 to allow the fluid 670 passing through the fluid destaticizer 100 to eliminate the electrostatic charge of the fluid 670. In some embodiments, the electrostatic value is greater than a predetermined value, for example, the electrostatic value is greater than 2 kV or 1 kV, the controller 540 opens the solenoid valve 620.

In some embodiments, the electrostatic measuring device 530 includes an electrostatic sensor 532 able to fix on the fluid delivery pipeline 650 to measure an electrostatic value of the fluid 670 in the fluid delivery pipeline 650.

In some embodiments, the solenoid valve 620 is a first solenoid valve, and the solenoid valve 630 is a second solenoid valve, for example, a deionized water solenoid valve. The solenoid valve 620 and the solenoid valve 630 can be a multiway valve, for example, a three-way valve. In addition, the solenoid valve 620 and the solenoid valve 630 are electrically connected to the controller 540.

In some embodiments, the second solenoid valve 630 includes a fluid valve and a deionized water valve. Simultaneously referring to step 455 of FIG. 4, the controller 540 controls the second solenoid valve 630 to close the fluid valve of the second solenoid valve 630 to stop the fluid flow to the fluid destaticizer 100. In addition, the second solenoid valve 630 is controlled to open the deionized water valve of the second solenoid valve 630 to flush the first solenoid valve 620 and the fluid destaticizer 100 with the deionized water (DIW), and the controller 540 closes the deionized water valve of the second solenoid valve 630 after the first solenoid valve 620 and the fluid destaticizer 100 is cleaned.

Hence, the first solenoid valve 620 and the fluid destaticizer 100 can be effectively cleaned by the deionized water through the second solenoid valve 630 so as to improve the cleanliness of the pipeline and avoid contamination of the subsequent process fluid.

In some embodiments, the first solenoid valve 620 and the second solenoid valve 630 can be opened together to allow the fluid 670 flowing into the fluid destaticizer 100, or the first solenoid valve 620 and the second solenoid valve 630 can be opened independently to allow the fluid 670 flowing into the fluid destaticizer 100 without departing from the spirit and the scope of the invention.

In some embodiments, the active fluid static elimination system 600 further includes a booster pump 660 installed in the fluid delivery pipeline 650 to provide the pressure for transporting the fluid 670.

Referring to FIGS. 1, 2 and 3, the fluid destaticizer 100 includes a valve main body 110, a one-way check valve 130, a discharge vessel 160 and an electrostatic discharger 180.

The one-way check valve 130 is installed in the valve main body 110, the discharge vessel 160 is disposed in the valve main body 110, and the discharge vessel 160 connected to the one-way check valve 130. The electrostatic discharger 180 is installed on the sidewall 162 of the discharge vessel 160 to guide the electrostatic charge 240 of the fluid 220 outwardly and the discharge vessel 160 is utilized to exhaust the fluid 250 from the valve main body 110. Because the fluid 250 contacts the electrostatic discharger 180 made of the metal material, the fluid in contact with the electrostatic discharger 180 has to discharge from the fluid destaticizer 100 to prevent the subsequent manufacturing process from contamination.

In some embodiments, the valve main body 110 includes a connecting portion 120 connected to a connecting section 230 of a delivery pipe 210 in the fluid delivery pipeline 200. The connecting portion 120 can also be connected to any other elements, for example, a solenoid valve or a bypass line, in the fluid delivery pipeline 200 to discharge the electrostatic charge and the fluid from the fluid delivery pipeline 200 without departing from the spirit and the scope of the invention.

Furthermore, the valve main body 110 may further include a discharge outlet 170 connected to the discharge vessel 160 to discharge the fluid 220 from the valve main body 110. The discharge outlet 170 is utilized to connect to an external discharge pipe 300 to transport the fluid 250 to a fluid recycling tank.

In some embodiments, the electrostatic discharger 180 includes an electrostatic discharging pin electrically connecting to a ground terminal 190 to guide the electrostatic charge in the fluid 220 to the ground terminal 190 so as to neutralize the electrostatic charge and prevent the electrostatic charge from accumulating in the delivery pipe 210.

In some embodiments, the delivery pipe 210 is a fluid delivery pipe made of perfluoroalkoxy alkanes (PFA) material.

In some embodiments, the one-way check valve 130 includes a piston 140 and a spring 150. When the pressure of the fluid is larger than a predetermined value, i.e. larger than 10 Kpa, the piston 140 may compress the spring 150 to allow the fluid flowing into the discharge vessel 160 and contacting to the electrostatic discharger 180 fixed on the sidewall 162 of the discharge vessel 160 so as to guide the electrostatic charge to the ground terminal 190 through the electrostatic discharger 180.

In addition, because the electrostatic discharger 180 is a pin type electrostatic discharger perpendicular to the sidewall 162 of the discharge vessel 160, the pin type electrostatic discharger 180 is perpendicular to the flowing direction of the fluid 250 to avoid the occurrence of fluid back splashing so as to prevent the fluid contacted the metal electrostatic discharger 180 from flowing back to the delivery pipe 210, thereby improving the quality and stability of the subsequent production process.

In some embodiments, the electrostatic discharging pin includes a noble metal electrostatic discharging pin which is made of noble metals with strong oxidation resistance and corrosion resistance, i.e. ruthenium, rhodium, palladium, silver, osmium, iridium, platinum and/or gold.

In some embodiments, the piston 140 is a perfluoroalkoxy alkanes (PFA) piston, and the valve main body 110 is a PFA valve main body.

In some embodiments, the spring 150 is a PFA spring, or a metal spring coated with a PFA coating layer to provide a suitable elasticity.

Accordingly, the active fluid static elimination system can install in the fluid delivery pipeline and control the solenoid valves according to the electrostatic value of the fluid measured by the electrostatic measuring device to discharge the electrostatic charge accumulating in the fluid delivery pipe out of the fluid delivery pipe. In addition, the piston, the spring and the valve main body can be made of the PFA material so as to effectively prevent the fluid from the metal contamination. Furthermore, the fluid in contact with the metal electrostatic discharger is directly discharged from the discharge outlet, and the solenoid valves and the electrostatic discharger are cleaned by the deionized water so as to further effectively avoid the pollution of the process fluid, thereby improving the production quality of the production line, further improving the safety of the fluid delivery, and greatly increasing the safety of the production process and the process yield.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. An active fluid static elimination system, installed in a connecting section of a fluid delivery pipeline, the active fluid static elimination system comprising:
    a solenoid valve connecting to the connecting section of the fluid delivery pipeline;
    an electrostatic measuring device measuring an electrostatic value of a fluid in the fluid delivery pipeline;
    a fluid destaticizer connecting to the solenoid valve; and
    a controller connecting to the electrostatic measuring device and the solenoid valve, wherein when the controller determines the electrostatic value of the fluid measured by the electrostatic measuring device is greater than a predetermined value, the controller opens the solenoid valve to allow the fluid passing through the fluid destaticizer to eliminate an electrostatic charge in the fluid.

2. The active fluid static elimination system of claim 1, wherein the electrostatic measuring device comprises an electrostatic sensor fixed on the fluid delivery pipeline to measure the electrostatic value of the fluid in the fluid delivery pipeline.

3. The active fluid static elimination system of claim 2, wherein the solenoid valve is a first solenoid valve, wherein the active fluid static elimination system further comprises a deionized water solenoid valve disposed between the first solenoid valve and the connecting section, and the deionized water solenoid valve is electrically connected to the controller.

4. The active fluid static elimination system of claim 3, wherein the controller opens the deionized water solenoid valve to wash the first solenoid valve and the fluid destaticizer with deionized water.

5. The active fluid static elimination system of claim 1, further comprising a booster pump equipped in the fluid delivery pipeline to provide a pressure for transporting the fluid.

6. The active fluid static elimination system of claim 1, wherein the fluid destaticizer comprises:
    a valve main body connected to the solenoid valve;
    a one-way check valve installed in the valve main body;
    a discharge vessel disposed in the valve main body, the discharge vessel connected to the one-way check valve, the discharge vessel comprising a sidewall; and
    an electrostatic discharger installed on the sidewall of the discharge vessel to discharge the electrostatic charge in the fluid and the fluid is exhausted from the valve main body through the discharge vessel.

7. The active fluid static elimination system of claim 6, wherein the one-way check valve comprises a piston and a spring, wherein the piston is a perfluoroalkoxy alkanes (PFA) piston, and the valve main body is a PFA valve main body.

8. The active fluid static elimination system of claim 7, wherein the spring is a PFA spring or a metal spring with a PFA coating.

9. The active fluid static elimination system of claim 8, wherein the electrostatic discharger comprises an electrostatic discharging pin electrically connected to a ground terminal.

10. The active fluid static elimination system of claim 9, wherein the electrostatic discharging pin comprises a noble metal electrostatic discharging pin.

* * * * *